United States Patent
Sandeep et al.

(10) Patent No.: US 12,353,761 B2
(45) Date of Patent: Jul. 8, 2025

(54) MEMORY SUB-SYSTEM TRANSFER QUEUE RETENTION

(71) Applicant: Micron Technology, Inc., Boise, ID (US)

(72) Inventors: Vinay Sandeep, Bangalore (IN); Sanandan Sharma, Hyderabad (IN); Amit Bhardwaj, Bangalore (IN); Prashanth Reddy Enukonda, Hyderabad (IN)

(73) Assignee: Micron Technology, Inc., Boise, ID (US)

( * ) Notice: Subject to any disclaimer, the term of this patent is extended or adjusted under 35 U.S.C. 154(b) by 171 days.

(21) Appl. No.: 17/887,366

(22) Filed: Aug. 12, 2022

(65) Prior Publication Data
US 2024/0053924 A1    Feb. 15, 2024

(51) Int. Cl.
*G06F 3/06* (2006.01)

(52) U.S. Cl.
CPC .......... *G06F 3/0659* (2013.01); *G06F 3/0619* (2013.01); *G06F 3/0656* (2013.01); *G06F 3/0679* (2013.01)

(58) Field of Classification Search
CPC .... G06F 3/0659; G06F 3/0619; G06F 3/0656; G06F 3/0679
See application file for complete search history.

(56) References Cited

U.S. PATENT DOCUMENTS

| | | | |
|---|---|---|---|
| 7,012,835 B2 | 3/2006 | Gonzalez et al. | |
| 7,805,632 B1* | 9/2010 | Luke ................... | G06F 11/1471 714/36 |
| 8,713,380 B2 | 4/2014 | Avila et al. | |
| 10,771,091 B2 | 9/2020 | Yang et al. | |
| 2004/0123055 A1* | 6/2004 | Solomon ............... | G06F 13/102 711/137 |
| 2014/0101372 A1 | 4/2014 | Jung et al. | |
| 2015/0089297 A1* | 3/2015 | Johnson .................... | G06F 8/00 714/38.1 |
| 2019/0286369 A1* | 9/2019 | Liu ........................ | G06F 3/0679 |
| 2021/0035627 A1* | 2/2021 | Tanpairoj ............ | G11C 11/4076 |
| 2022/0083234 A1* | 3/2022 | Esaka ...................... | G06F 3/061 |
| 2023/0127321 A1* | 4/2023 | Shatsky .............. | G06F 12/0871 711/141 |

FOREIGN PATENT DOCUMENTS

TW    202307851 A  *  2/2023    ........... G06F 3/0613

* cited by examiner

*Primary Examiner* — Eric Cardwell
(74) *Attorney, Agent, or Firm* — Brooks, Cameron & Huebsch, PLLC

(57) ABSTRACT

A method includes issuing a program command to a logic unit (LUN) of a memory device, writing a plurality of commands to a transfer queue within the memory device, detecting a program failure for the LUN of the memory device, and maintaining a number of the plurality of commands in the transfer queue.

16 Claims, 4 Drawing Sheets

MEMORY SUB-SYSTEM TRANSFER QUEUE RETENTION

TECHNICAL FIELD

Embodiments of the disclosure relate generally to memory sub-systems, and more specifically, relate to memory sub-system transfer queue retention.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
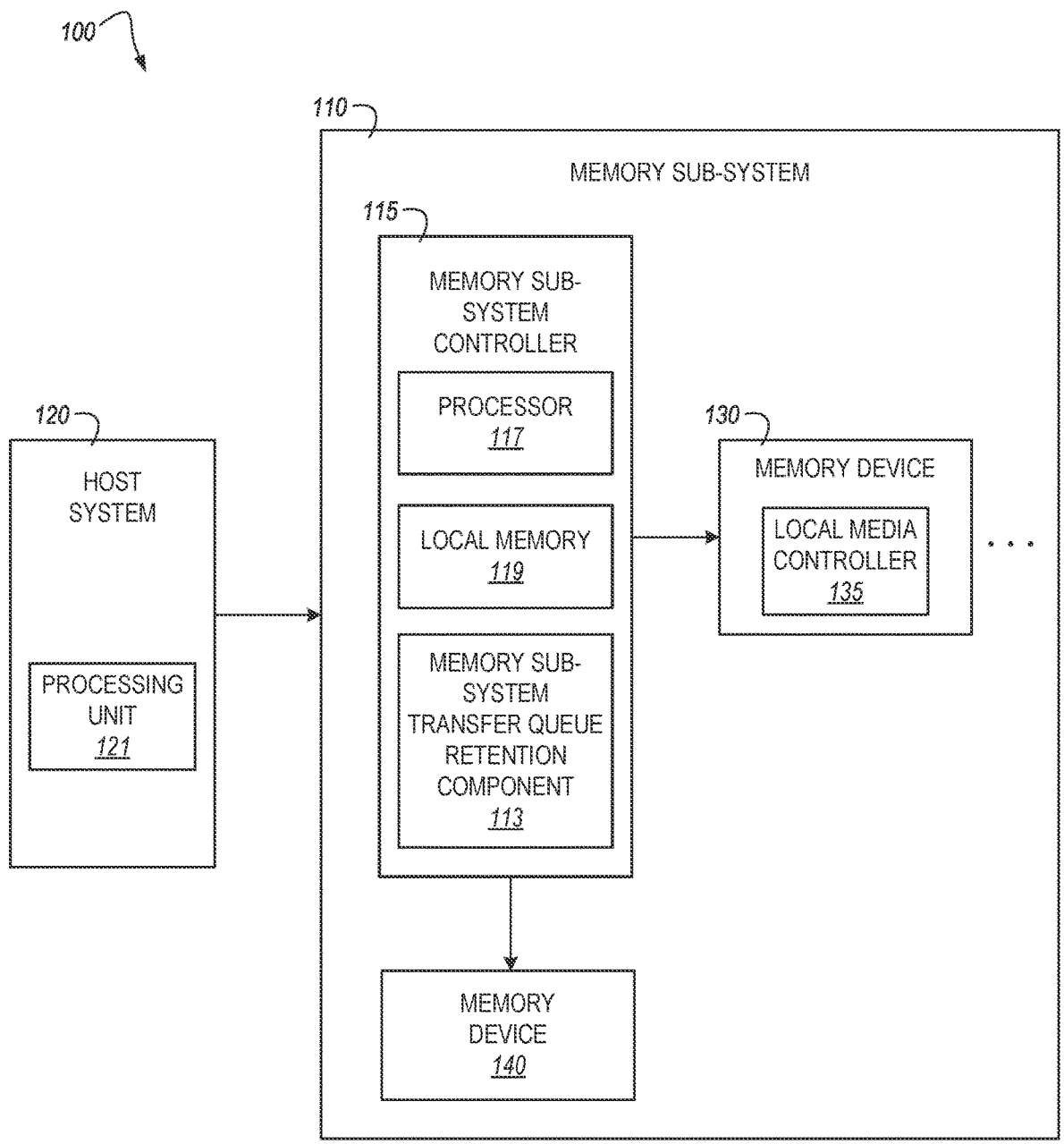
FIG. 1 illustrates an example computing system that includes a memory sub-system in accordance with some embodiments of the present disclosure.

Aspects of the present disclosure are directed to memory sub-system transfer queue retention, in particular to memory sub-systems that include a memory sub-system transfer queue retention component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be grouped into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

During operation a memory sub-system may experience a program failure (e.g., following the issuance of a program command). Previously, upon such a program failure, all program commands for the failed LUN are flushed from the transfer queue and are rescheduled. All commands are rescheduled, except for program commands and erase commands for the failed block, and sense (e.g., read) commands on failed pages. However, this previous program failure response relies upon extensive data structures and/or firmware (e.g., to reschedule all of the commands for the failed LUN). For instance, in previous approaches, once a program failure was detected, as mentioned, all transfer queue commands are flushed (e.g., to a reissue component, such as a state machine for instance); after flushing all commands from the transfer queue a scheduler is blocked from the program failure block; then the reissue component reissues (e.g., replays) all flushed commands, after which the scheduler is released.

Aspects of the present disclosure address the above and other deficiencies by maintaining (e.g., retaining) a number of commands in a transfer queue subsequently to detecting a program failure for a LUN (e.g., following the issuance of a program command). Maintaining the number of commands in a transfer queue subsequent to detection of the program failure for the LUN can eliminate data structure complexities and/or eliminate previously utilized reissue/replay components previously utilized for a program failure. Because embodiments described herein allow for the number of commands to be maintained in the transfer queue subsequent to detection of the program failure, the maintained commands may be pushed to the LUN, rather than being reissued.

These and other benefits of the embodiments contemplated herein improve the functioning of a computing system (e.g., a memory sub-system and/or computing system) by reducing the additional components mentioned above and/or by reducing a quantity of reissued commands exhibited by current approaches by allowing for a reduction in power consumption of the computing system, reduction of data traffic involving the computing system, and/or reduction of adverse effects (e.g., read disturb, write disturb, write amplification, etc.) that result from memory accesses that involve, in particular, non-volatile memory devices.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include a transfer queue retention component 113. Although not shown in FIG. 1 so as to not obfuscate the drawings, the transfer queue retention component 113 can include various circuitry to facilitate maintaining a number of commands to a transfer queue for a memory sub-system and/or components of the memory sub-system (e.g., subsequently to detecting a program failure for a LUN of the memory device). In some embodiments, the transfer queue retention component 113 can include special purpose circuitry in the form of an ASIC, FPGA, state machine, and/or other logic circuitry that can allow the transfer queue retention component 113 to orchestrate and/or perform operations to selectively perform transfer queue retention operations for the memory device 130 and/or the memory device 140 based on a precedingly occurring program failure for a LUN. As used herein, a component can be control circuitry (e.g., circuitry to control performance of the operations described in connection with the transfer queue retention component).

In some embodiments, the memory sub-system controller 115 includes at least a portion of the transfer queue retention component 113. For example, the memory sub-system controller 115 can include a processor 117 (processing device) configured to execute instructions stored in local memory 119 for performing the operations described herein. In some embodiments, the transfer queue retention component 113 is part of the host system 110, an application, or an operating system.

In a non-limiting example, an apparatus (e.g., the computing system 100 and/or components thereof, such as the memory sub-system 110, etc.) can include a memory sub-system transfer queue retention component 113. The memory sub-system transfer queue retention component 113 can be resident on the memory sub-system 110. As used herein, the term "resident on" refers to something that is physically located on a particular component, such as a circuit board, substrate, package, or similar assembly of physically directly coupled (e.g., soldered) hardware components of the apparatuses and/or systems described herein. For example, the memory sub-system transfer queue retention component 113 being "resident on" the memory sub-system 110 refers to a condition in which the hardware circuitry that comprises the memory sub-system transfer queue retention component 113 is physically located on the memory sub-system 110. The term "resident on" can be used interchangeably with other terms such as "deployed on" or "located on," herein.

The memory sub-system transfer queue retention component 113 can be configured to maintain a number of commands in a transfer queue subsequently to detecting a program failure for a LUN of the memory device. For example, the memory sub-system transfer queue retention component 113 can store, without overwriting, such commands in a set of physically addressable memory cells that are associated with the transfer queue. As described above, the memory components can be memory dice or memory packages that form at least a portion of the memory device 130.

The memory sub-system transfer queue retention component 113 that can be further configured to recover programmable data from a computer component. The programmable data can correspond to one or more of a number of the plurality of commands maintained in the transfer queue subsequently to detecting a program failure for a LUN of the memory device. As an example, the programmable data can be single level cell (SLC) programmable data and the computer component can be a buffer. As another example, the programmable data can be quad level cell (QLC) programmable data and the computer component can be a cache.

Figure 2:
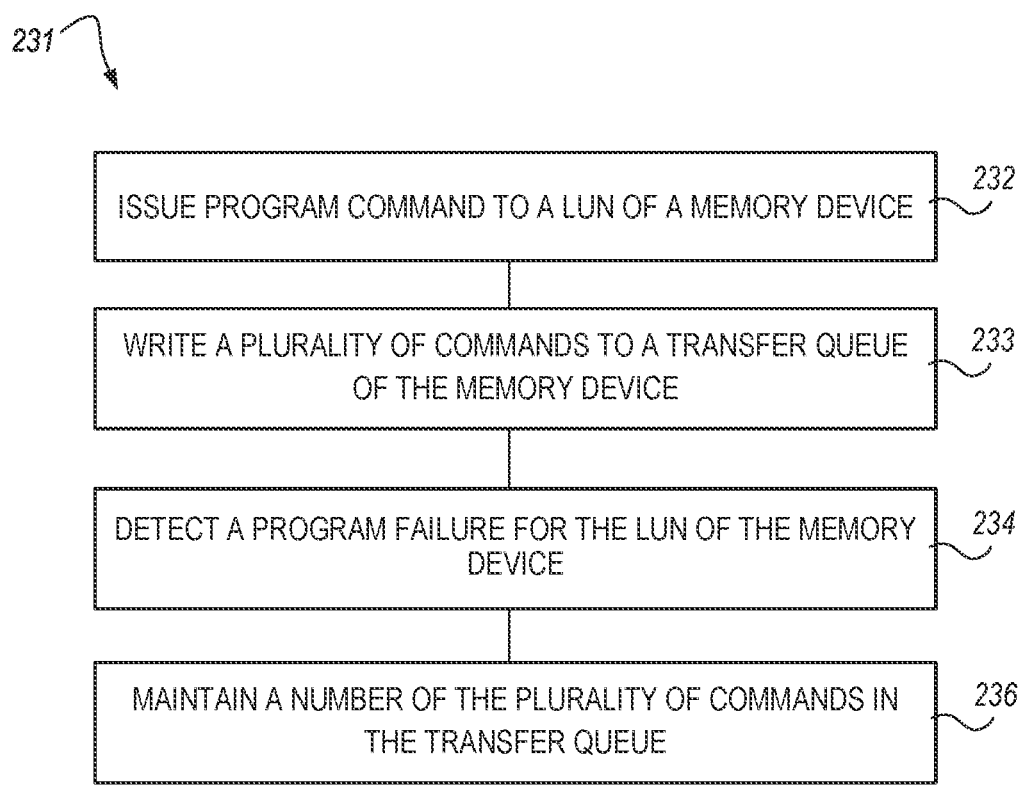
FIG. 2 is a flow diagram corresponding to memory sub-system transfer queue retention in accordance with some embodiments of the present disclosure.

FIG. 2 is a flow diagram 231 corresponding to memory sub-system transfer queue retention in accordance with some embodiments of the present disclosure. The flow 231 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the flow 231 is performed by the memory sub-system transfer queue retention component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 232, a program command can be issued to a LUN of a memory device. One more embodiments provide that a computing component (e.g., a scheduler) can issue the program command to the LUN of the memory device. One more embodiments provide the computer component (e.g., a scheduler) can issue only one program command per each LUN of the memory device, such that only one program command per each LUN of the memory device is pending (e.g., unexecuted). As an example, as subsequent, single, program command may be issued to LUN of the memory device after completion (e.g., writing to the LUN) of a preceding program command.

At operation 233, a plurality of commands (e.g., in association with the program command issued to the LUN of a memory device) can be written to a transfer queue of the memory device. Examples of the plurality of commands include sense (e.g., read) commands and erase commands, for instance. The plurality of commands can be directed to the LUN of the memory device for which the program command was issued.

At operation 234, a program failure (e.g., a failure of the issued program command mentioned at operation 232) for the LUN of the memory device can be detected. One or more embodiments provide that the program failure involves a number of SLC blocks and/or a number of QLC blocks. One or more embodiments provide that the program failure can be indicated by status indicator, such as a flag or a bit pattern.

At operation 236, a number of the plurality of commands in the transfer queue can be maintained (e.g., subsequently to detecting the program failure for the LUN); this is in contrast to previous approaches where each command in a transfer queue is flushed (e.g., removed) from the transfer queue subsequent to a program failure for a LUN. As mentioned, this previous program failure response relies upon extensive data structures and/or firmware (e.g., to reschedule all of the commands for the failed LUN).

One or more embodiments provide that the number of the plurality of commands, maintained in the transfer queue subsequent to a program failure, is based at least in part on a percentage of a total number of commands in the transfer queue. For instance, greater than 5% (e.g., from 10% to 50%), greater than 10% (e.g., from 15% to 65%), or greater than 15% (e.g., from 20% to 75%) of commands can be maintained in the transfer queue subsequent to a program failure, based on a percentage of a total number of commands in the transfer queue. One or more embodiments provide that 100% of commands can be maintained in the transfer queue subsequent to a program failure, based on a percentage of a total number of commands in the transfer queue. One or more embodiments provide that other percentages of commands can be maintained in the transfer queue subsequent to a program failure, based on a percentage of a total number of commands in the transfer queue.

One or more embodiments provide that the number of the plurality of commands, maintained in the transfer queue subsequent to a program failure, is based at least in part on a type of command. For instance, each of the number of the plurality of commands, maintained in the transfer queue subsequent to a program failure can be sense (e.g., read) commands. One or more embodiments provide that the number of the plurality of commands, maintained in the transfer queue subsequent to a program failure can be erase commands. One or more embodiments provide that the number of the plurality of commands, maintained in the transfer queue subsequent to a program failure can be sense commands and erase commands.

One or more embodiments provide that the number of the plurality of commands, maintained in the transfer queue subsequent to a program failure, is based at least in part on a first in first out policy. For instance, each of the number of the plurality of commands, maintained in the transfer queue subsequent to a program failure can be earlier written to the transfer queue, relative to commands that are not maintained in the transfer queue subsequent to the program failure.

One or more embodiments provide that the number of the plurality of commands, maintained in the transfer queue subsequent to a program failure, is based at least in part on a size of data associated with the commands. For instance, each of the number of the plurality of commands, maintained in the transfer queue subsequent to a program failure, can have a relatively smaller associated data size (e.g., data to be read), as compared to each commands that are not maintained in the transfer queue subsequent to the program failure. One or more embodiments provide that each of the number of the plurality of commands, maintained in the transfer queue subsequent to a program failure, can have a relatively larger associated data size (e.g., data to be read), as compared to each commands that are not maintained in the transfer queue subsequent to the program failure.

One or more embodiments provide that the number of the plurality of commands maintained in the transfer queue subsequent to a program failure can be pushed to (e.g., executed) the LUN with the program failure. For instance, a sense operation (e.g., read operation) may be performed (e.g., on a number of memory cells of the failed LUN) subsequently to receiving the indication of a program failure for the LUN.

One or more embodiments provide that data can be recovered a from a computer component (e.g., in association with one or more of the commands that is maintained in the transfer queue subsequent to the program failure). For instance, the data can be single level cell (SLC) data and the computer component can be a buffer. The data can be quad level cell (QLC) data and the computer component can be a cache. One or more embodiments provide that the SLC data can be programmed to the memory device. One or more embodiments provide that the QLC data can be programmed to the memory device.

Pushing the plurality of commands, maintained in the transfer queue subsequent to the program failure, to the LUN with the program failure can eliminate data structure complexities and/or eliminate previously utilized reissue/replay components previously utilized for a program failure. Because the number of commands are maintained in the transfer queue subsequently to detecting the program failure, the maintained commands may be pushed to the LUN, rather than being reissued by a previously utilized computing component.

Figure 3:
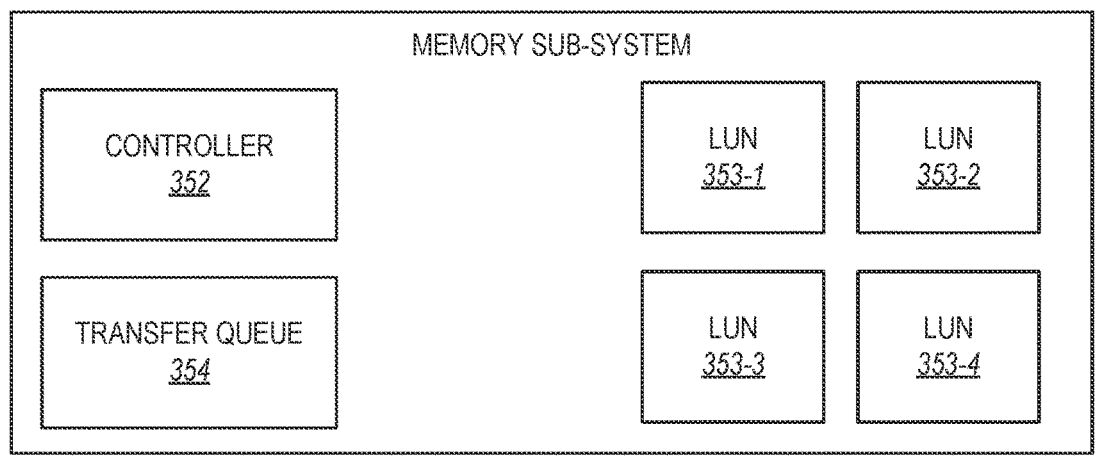
FIG. 3 is a block diagram of a portion of a memory sub-system in accordance with some embodiments of the present disclosure.

FIG. 3 is a block diagram of a portion of a memory sub-system 351 in accordance with some embodiments of the present disclosure. The memory sub-system 351 may be utilized for causing performance (e.g., with controller 352) of any one or more of the methodologies discussed herein. The memory sub-system 351 may correspond to the memory sub-system 110 of FIG. 1, for instance, or can be used to perform the operations of a controller (e.g., to execute an operating system to perform operations corresponding to the transfer queue retention component 113 of FIG. 1).

The memory sub-system 351 can include a transfer queue 354, as shown in FIG. 3. One or more embodiments provide that a plurality of commands (e.g., in association with a program command issued to a LUN (e.g., LUN 353-1, LUN 353-2, LUN 353-4, or LUN 353-4) can be written to the transfer queue 354. Examples of the plurality of commands include sense (e.g., read) commands and erase commands, for instance. While FIG. 3 illustrates four LUNs, embodiments are not so limited. For instance, memory sub-system 351 may include less than four LUNs or more than four LUNs.

As mentioned, a program failure (e.g., a failure of an issued program command mentioned) for a LUN (e.g., LUN 353-1, LUN 353-2, LUN 353-4, or LUN 353-4) can be detected. Embodiments of the present disclosure provide that subsequently to detecting the program failure for the LUN, a number of the plurality of commands in the transfer queue 354 can be maintained (e.g., in contrast to be flushed (removed) from a transfer queue subsequent to a program failure for a LUN as in previous approaches).

One or more embodiments provide that the number of the plurality of commands maintained in the transfer queue 354 subsequent to a program failure can be pushed to (e.g., executed) the LUN (e.g., LUN 353-1, LUN 353-2, LUN 353-4, or LUN 353-4) with the program failure. For instance, a sense operation (e.g., read operation) may be performed (e.g., on a number of memory cells of the failed LUN) subsequently to receiving the indication of a program failure for the LUN.

Figure 4:
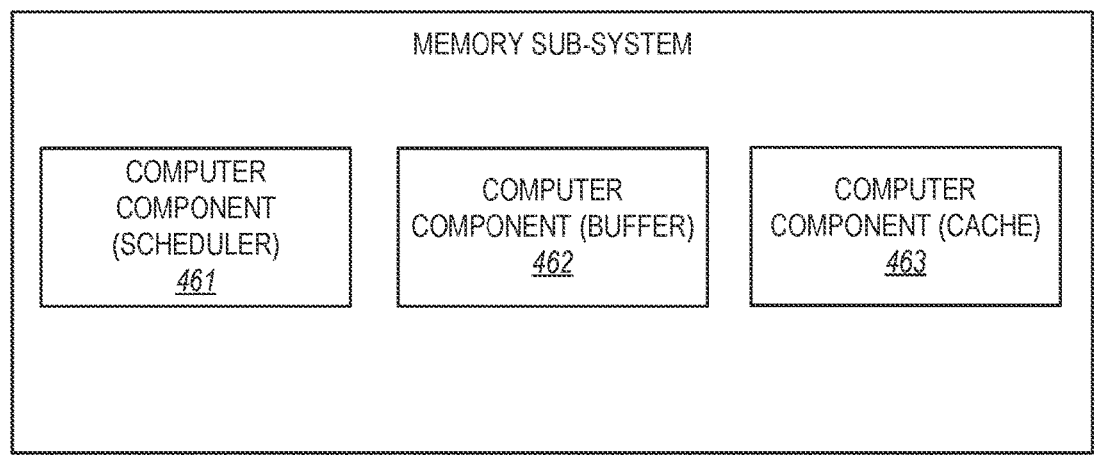
FIG. 4 is a block diagram of a portion of a memory sub-system in accordance with some embodiments of the present disclosure.

FIG. 4 is a block diagram of a portion of a memory sub-system 451 in accordance with some embodiments of the present disclosure. The memory sub-system 451 may be utilized for causing performance (e.g., with a controller) of any one or more of the methodologies discussed herein. The memory sub-system 451 may correspond to the memory sub-system 110 of FIG. 1, for instance, or can be used to perform the operations of a controller (e.g., to execute an operating system to perform operations corresponding to the transfer queue retention component 113 of FIG. 1).

As shown in FIG. 4, the memory sub-system 451 can include a number of computer components (e.g., computer component 461, computer component 462, computer component 463). One or more embodiments provide that computer component 461 may be a scheduler. As mentioned, computer component 461 may issue commands (e.g., a program command) to a LUN (e.g., LUN 353-1, LUN 353-2, LUN 353-4, or LUN 353-4 shown in FIG. 3).

One or more embodiments provide that computer component 462 may be a buffer. As mentioned, one or more embodiments provide that data can be recovered a from a computer component (e.g., in association with one or more of the commands that is maintained in the transfer queue subsequent to the program failure). One or more embodiments provide that the data can be single level cell (SLC) data.

One or more embodiments provide that computer component 463 may be a cache. As mentioned, one or more embodiments provide that data can be recovered a from a computer component (e.g., in association with one or more of the commands that is maintained in the transfer queue subsequent to the program failure). One or more embodiments provide that the data can be quad level cell (QLC).

Figure 5:
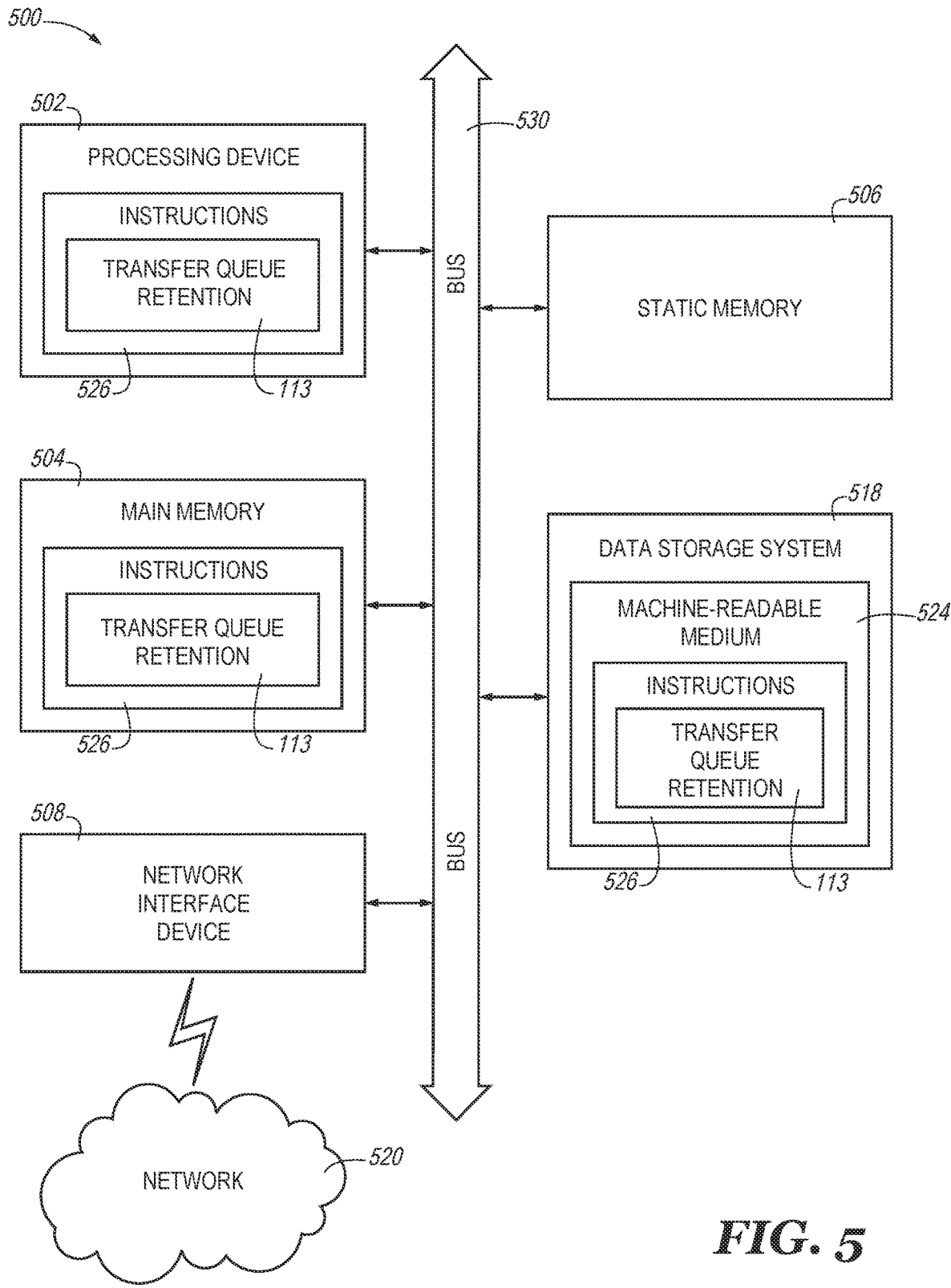
FIG. 5 is a block diagram of an example computer system in which embodiments of the present disclosure may operate.

FIG. 5 is a block diagram of an example computer system 500 in which embodiments of the present disclosure may operate. For example, FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the transfer queue retention component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a transfer queue retention component (e.g., the transfer queue retention component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
issuing a program command to a logic unit (LUN) of a memory device;
writing a plurality of commands to a transfer queue of the memory device;
detecting a program failure for the LUN of the memory device, wherein the program failure is a failure of the program command;
subsequently to receiving the indication of the program failure for the LUN maintaining one or more of the plurality of commands in the transfer queue without overwriting the one or more of the plurality of commands in a set of physically addressable memory cells that are associated with the transfer queue, wherein the one or more of the plurality of commands include access commands;
pushing one or more of the maintained commands to the LUN that has the failure; and
recovering data from a computer component, wherein the data corresponds to one or more of the commands maintained in the transfer queue.

2. The method of claim 1, further comprising recovering single level cell (SLC) data from a buffer.

3. The method of claim 2, further comprising recovering quad level cell (QLC) data from a cache.

4. The method of claim 3, further comprising programming the recovered QLC data to the memory device.

5. The method of claim 2, further comprising programming the recovered SLC data to the memory device.

6. An apparatus, comprising:
a transfer queue retention component configured to:
receive a plurality of commands to a transfer queue;
receive an indication of a program failure for a logic unit (LUN), wherein the program failure is a failure of a program command issued to the LUN;
maintain one or more of the plurality of commands in the transfer queue, subsequently to receiving the indication of the program failure for the LUN, without overwriting the one or more of the plurality of commands in a set of physically addressable memory cells that are associated with the transfer queue, wherein the one or more of the plurality of commands include access commands;
pushing one or more of the maintained commands to the LUN that has the failure; and
recover data from a computer component, wherein the data corresponds to one or more of the commands maintained in the transfer queue.

7. The apparatus of claim 6, wherein the data is single level cell (SLC) data and the computer component is a buffer.

8. The apparatus of claim 6, wherein the data is quad level cell (QLC) data and the computer component is a cache.

9. The apparatus of claim 6, wherein one or more of the plurality of commands is based on a size of data associated with the commands.

10. A system, comprising:
a plurality of memory components arranged to form a stackable cross-gridded array of memory cells; and
a processing device coupled to the plurality of memory components, wherein the processing device is configured to:
receive plurality of commands to a transfer queue;
receive an indication of a program failure for a logic unit (LUN), wherein the program failure is a failure of a program command issued to the LUN;
maintain one or more of the plurality of commands in the transfer queue, subsequently to receiving the indication of a program failure for the LUN, without overwriting the one or more of the plurality of commands in a set of physically addressable memory cells that are associated with the transfer queue, wherein the one or more of the plurality of commands include access commands;
pushing one or more of the maintained commands to the LUN that has the failure; and
recover data from a computer component, wherein the data corresponds to one or more of the plurality of commands maintained in the transfer queue.

11. The system of claim 10, wherein the processing device is configured to:
perform sense operations subsequently to receiving the indication of a program failure for the LUN.

12. The system of claim 10, wherein the data is single level cell (SLC) data and the computer component is a buffer.

13. The system of claim 10, wherein the data is quad level cell (QLC) data and the computer component is a cache.

14. The system of claim 10, wherein the indication comprises a status indicator.

15. The system of claim 10, wherein the indication comprises a flag.

16. The system of claim 10, wherein the memory components comprise memory dice.

* * * * *